(12) United States Patent
Itoh (10) Patent No.: US 6,560,880 B1
(45) Date of Patent: May 13, 2003

(54) ROTARY INTERNAL TOOTHED SAW (75) Inventor: Kazuo Itoh, Kasai (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/544,187

(22) Filed: Apr. 6, 2000

(30) Foreign Application Priority Data

Apr. 7, 1999 (JP) ............................................ 11-099882
Oct. 26, 1999 (JP) ............................................ 11-303604

(51) Int. Cl.$^7$ .............................................. B23D 45/16
(52) U.S. Cl. ............................................ 30/389; 83/383
(58) Field of Search ........................ 30/389, 95; 83/535

(56) References Cited

U.S. PATENT DOCUMENTS 2,490,225 A * 12/1949 Chase ........................... 30/386
3,086,567 A *  4/1963 Jetten ........................... 30/386

FOREIGN PATENT DOCUMENTS

JP      S51-88887 (U) A     7/1976

* cited by examiner

*Primary Examiner*—Douglas D. Watts
(74) *Attorney, Agent, or Firm*—Koda & Androlia (57) ABSTRACT

A versatile saw that can be used as a high-branch-pruning saw, etc., employing an annular internal toothed saw disk having internal teeth on its internal circumference. Each of a pair of openable holders support the periphery of an annular two-piece internal toothed saw disk and maintain the internal toothed saw disk in an annular form with the holders closed. An object is cut by the internal teeth by rotating the internal toothed saw disk maintained in an annular shape while being held by the holders along its periphery. The rotating internal toothed saw disk is capable of stopping at a prescribed position of the holder. Split internal toothed saw disks are held by the holders which are openable. The holders are opened to facilitate the placing of the object inside the internal toothed saw disk. In order to introduce the object inside the internal toothed saw disk, one part of the annular internal toothed saw disk can incorporate a cut section so that the saw disk can be opened at this cut section.

6 Claims, 10 Drawing Sheets

ROTARY INTERNAL TOOTHED SAW

BACKGROUND OF THE INVENTION

1. Field of the Invention

The present invention relates to an internal toothed saw, the internal circumference of which being provided with saw teeth for cutting an object, and more particularly to a versatile internal toothed saw that can be used as a pruning saw, and in particular, as a high-branch-pruning saw for pruning high branches.

2. Prior Art

Among conventional high-branch-pruning saws, manually operated types with saw teeth fastened at the tip of a long supporting stick and electric saws such as chain saws are known.

A type of saw which cuts the object with saw teeth formed on the periphery of a disk is generally known, and a method for cutting the object using a rotating annular internal toothed saw disk is also known as it is disclosed in Japanese Utility Model Application Laid-Open No. S51-88887. But the method for cutting the object using a rotating annular internal toothed saw disk is only used as a precision cutter employing a special thin cutter disk and not as a general saw such as a pruning saw for gardening.

Conventional high-branch-pruning saws, whether manual or electric, are used for cutting branches from a certain direction. Therefore, it is not always possible to cut a given branch accurately depending on the way it grows. For example, if the branch is cut from above, the weight of the branch itself acts on it to open the cut. But this way of cutting is not possible using a conventional high-branch-pruning saw.

Using a conventional annular internal toothed saw disk that rotates, the object is cut by inserting its axial tip inside the internal circumference of the internal toothed saw disk. This is useful when slicing the end surface of the object. However, a conventional annular internal toothed saw disk is not capable of cutting a long object at an arbitrary position.

SUMMARY OF THE INVENTION

The object of the present invention is to provide a versatile saw using a rotary internal toothed saw disk that is capable of cutting the object at an arbitrary position. More specifically, the objective of the present invention is to provide a saw such as a high-branch-pruning saw that is capable of cutting a branch from an arbitrary direction, for example, from the top of the branch.

The rotary internal toothed saw of the present invention comprises an openable pair of holders and an annular two-piece internal toothed saw disk that is held by the holders. The openable pair of holders support the periphery of the two-piece internal toothed saw, and are capable of maintaining the annular shape of the internal toothed saw disk with the holders closed. The internal toothed saw disk, which is rotated, is designed to stop at a fixed position with respect to the holders, and at this position, each part of the two-piece internal toothed saw disk is held by the corresponding holder in such a way that they can be opened together with their corresponding holders.

The above configuration makes it possible for the holders supporting the two-piece annular internal toothed saw disk to open and have the object introduced inside the internal toothed saw disk at any position of the object at which the object is required to be cut. When the holders are closed and the internal toothed saw disk is rotated maintaining its annular shape, an object can be cut by the internal teeth of the internal toothed saw disk. The pair of holders which are openable for introducing the object inside the internal toothed saw disk, may be opened by flipping both of them open, but it is also possible to fix one of them and flip open just the other so that the latter opens relative to the former. The holders can also open in any direction, e.g., parallel to the plane, perpendicular to the plane, etc. The important thing is that the object can be introduced inside the internal toothed saw disk.

As a way of introducing the object inside the annular internal toothed saw disk, the internal toothed saw disk may be cut at one place and supported by a holder which is at least divided at one point along its periphery, wherein the internal toothed saw disk is rotated with its annulus maintained in a planar condition and is stopped at the position where the divided position of the holder and the cut position of the internal toothed saw disk meet, and both parts of the holder move in relatively different directions that are each perpendicular to the plane of the internal toothed saw disk to allow the cut part of the internal toothed saw disk to open.

It is also possible to hold the periphery of an annular internal toothed saw disk, which is cut at one place, by means of a holder, which is divided into several parts, wherein some of the several parts of the divided holder hold the internal toothed saw disk and some of the parts of the divided holder are openable so that the internal toothed saw disk can be exposed, and at the cut position of the exposed internal saw disk the cut part can be opened by forces acting in directions perpendicular to the plane of the internal toothed saw disk.

BRIEF DESCRIPTION OF THE DRAWINGS

FIG. 7 is a front view of another example of an internal toothed saw disk used in the present invention; and.

DETAILED DESCRIPTION OF THE PREFERRED EMBODIMENTS

The embodiments of the present invention will now be described by reference to the accompanying drawings. In the following explanation, the word "holder" may mean an indivisible part of a holder assembly or it may also mean such an assembly in its entirety.

Figure 1:
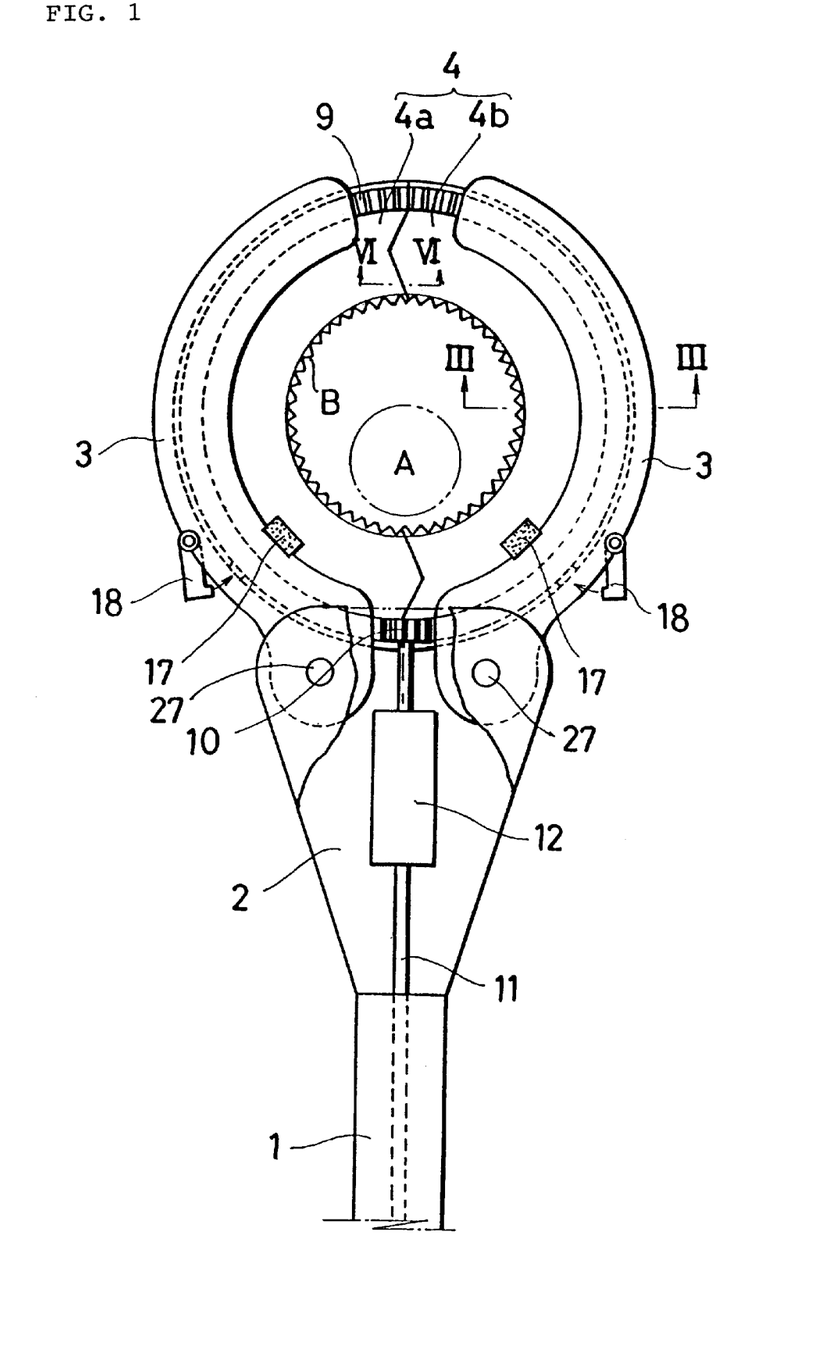
FIG. 1 is a front view of an example of a rotary internal toothed saw according to the present invention with the holders closed and ready to cut the object.
Figure 2:
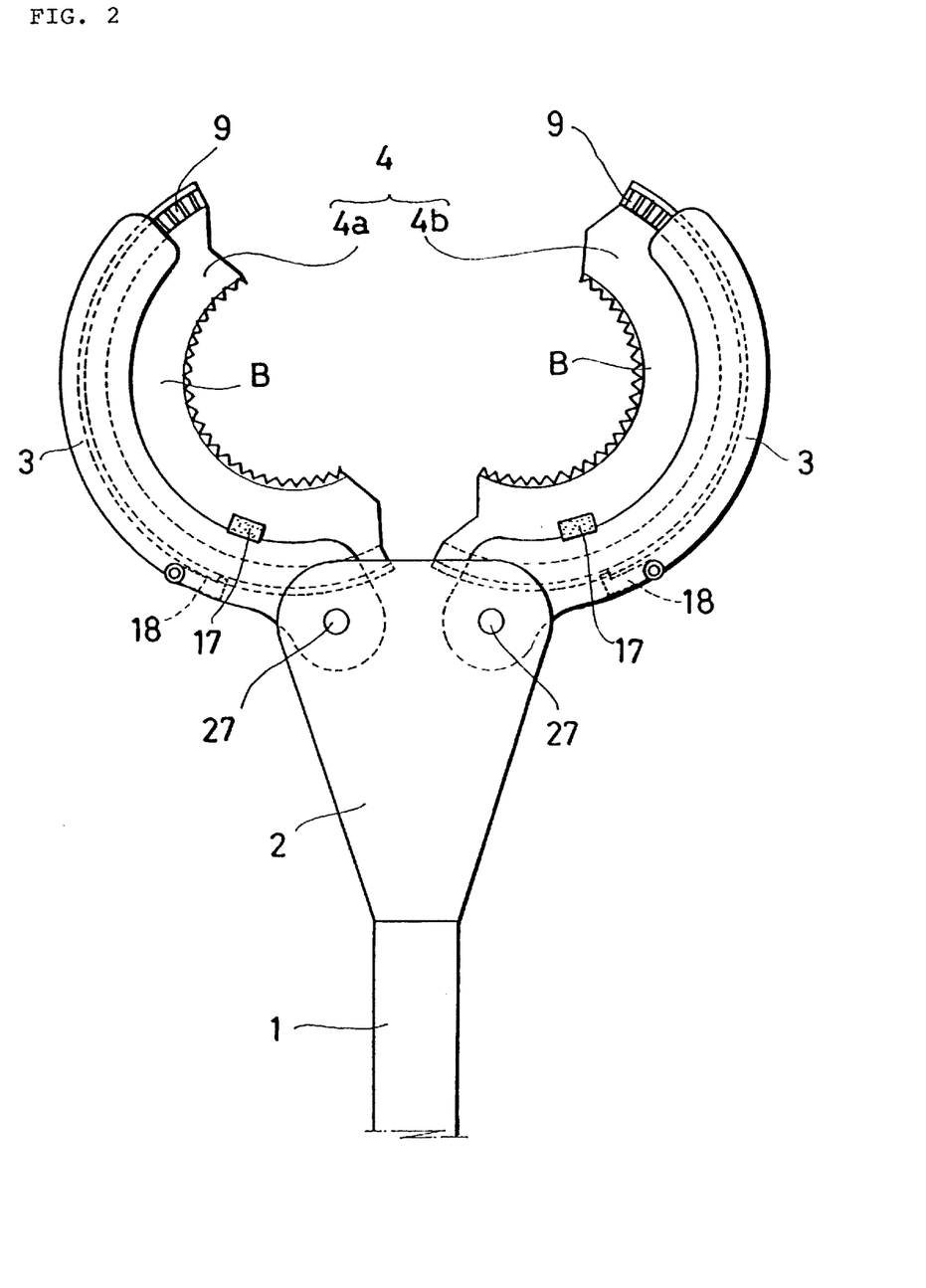
FIG. 2 is a front view showing an example of the same internal toothed saw with its holders open.

The embodiments illustrated in the drawings are all applicable as a high-branch-pruning saw comprising a rotary internal toothed saw mounted at the tip of a long supporting stick. FIG. 1 is a front view of an embodiment comprising a holder that is openable to the left and right, showing the condition in which the holder is closed. FIG. 2 is a front view of the same embodiment showing the condition in which the holder is open.

A mount 2 is established at the tip of supporting stick 1. Mount 2 supports the base parts of quasi semicircular holders 3, 3 via support shafts 27 each running at a right angle to the plane of the internal toothed disk. This arrangement makes it possible for the holders to open, pivoting around the shafts 27. When the holders are closed, annular internal toothed saw disk 4, which is split into two as is shown in FIG. 1, is rotated while maintaining its annulus. The quasi semicircular holders 3, 3 may be axially supported at one point of mount 2, but as shown in the drawings, the provision of two support shafts 27 at different positions on mount 2 makes it possible to allow the holders 3, 3 to open more widely.

Figure 4:
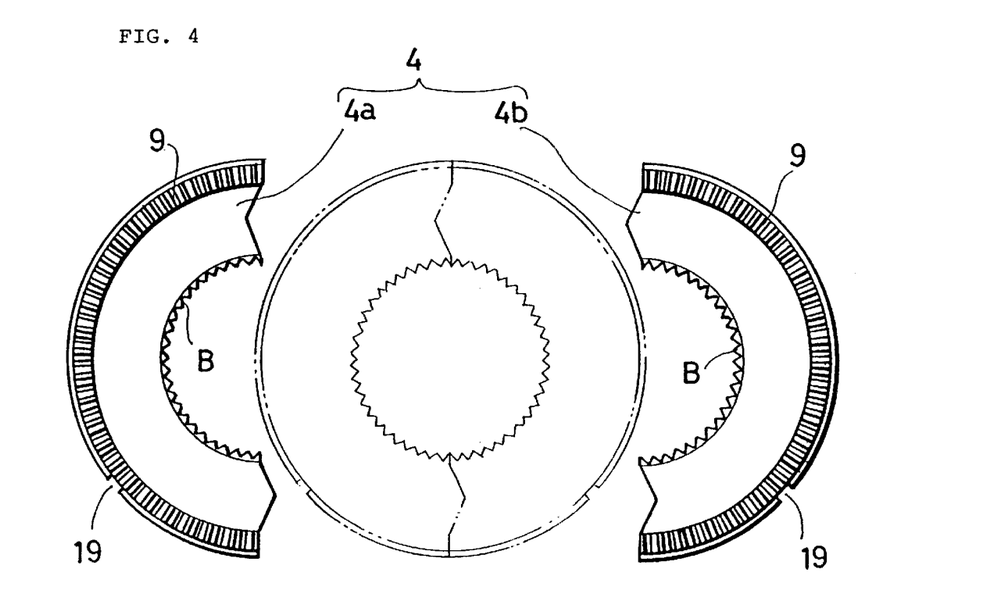
FIG. 4 is a front view of an example of an internal toothed saw disk used in the present invention.
Figure 5:
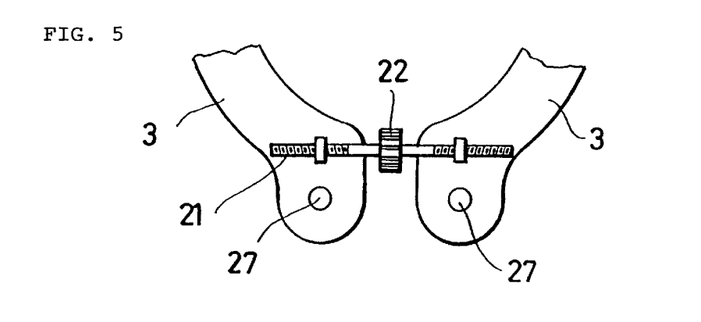
FIG. 5 is a front view showing an example of the opening device of the holder.
Figure 6:
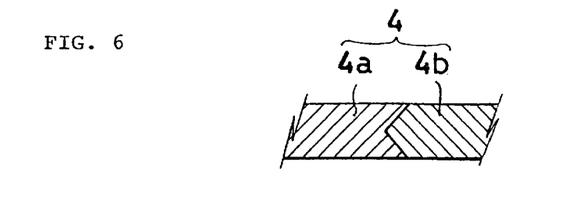
FIG. 6 is a sectional view of the saw taken along the line VI—VI in FIG. 1.

The internal circumferential parts of holders 3, 3, which are axially supported so as to be able to open to the left and right, hold the periphery of the annular internal toothed saw disk 4 in such a way that the internal toothed saw disk 4 can rotate freely. The annular internal toothed saw disk 4 held by holders 3, 3 is divided into two pieces with their cut ends shaped like the letter V as shown in FIG. 4. An annulus, as shown by alternate long and two short dashes lines, is made by matching a split internal toothed saw disk 4a and a split internal toothed saw disk 4b. In the embodiment shown in FIG. 4, the cut ends are shaped like the letter V, so when the two saw disks are matched, they form an accurate annular shape. The cross sections of the cut ends can be wedge-shaped as shown in FIG. 6 to prevent the two saw disks from being unaligned in the directions of thickness. When the holders 3, 3, which support the peripheries of the split internal toothed saw disk 4a and the split internal toothed saw disk 4b, are closed inwards, i.e., towards each other, the integral annular internal toothed saw disk 4 is formed and it can rotate as an internal toothed saw disk.

Rotating the two-piece annular internal toothed saw disk 4 while maintaining its annular shape entails two things: maintaining the annular shape of the internal toothed saw disk 4, and rotating the internal toothed saw disk 4 smoothly with respect to the holders 3, 3. One way of maintaining the annular shape of the two-piece internal toothed saw disk is shown in FIG. 1. In this embodiment, the two-piece internal toothed saw disk 4 is held tightly by the left and right holders 3, 3 so as to maintain its annular shape. In another embodiment, shown in FIG. 7, the split internal toothed saw disks 4a and 4b are engaged with each other to maintain the annular shape of the two-piece internal toothed saw disk 4. One of the various means of and constructions for engaging the split internal toothed saw disks 4a, 4b is shown in FIGS. 7 and 8.

Figure 7:
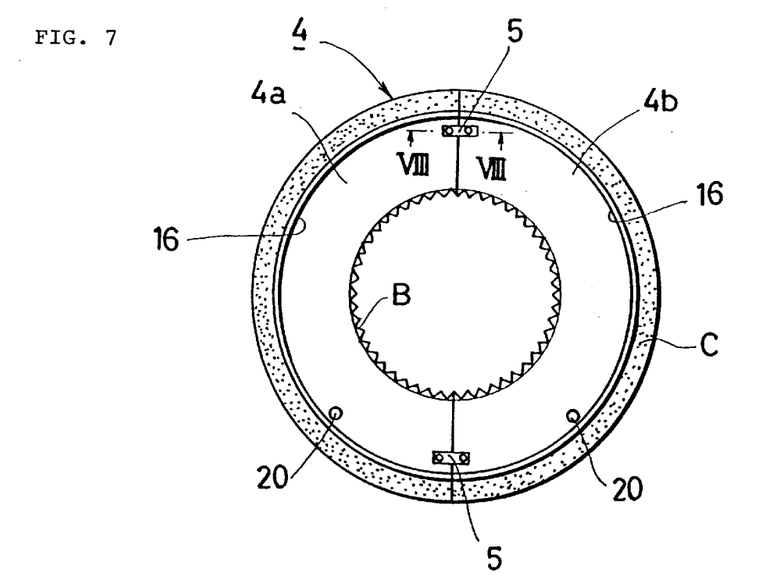
Figure 8:
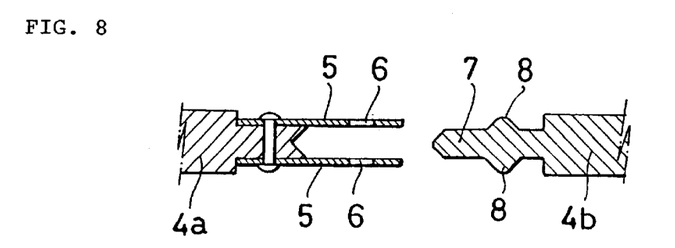
FIG. 8 is an enlarged sectional view of the saw taken along the line VIII—VIII in FIG. 7.

The split internal toothed saw disks 4a, 4b shown in FIGS. 7 and 8 are engaged with each other by means of two leaf springs 5, 5, which project from split internal toothed saw disk 4a to split internal toothed saw disk 4b. The base parts of these leaf springs 5, 5 are fastened on the front and back surfaces of internal toothed saw disk 4a, while a part of the split internal toothed saw disk 4b engages the leaf springs 5, 5. In the example shown in these drawings, the leaf springs 5, 5 fastened to the split internal toothed saw disk 4a by their base parts are provided with engagement holes 6, 6, while the split internal toothed saw disk 4b has an engagement part 7, which is provided with engagement projections 8, 8 on the front and back surfaces thereof. In this embodiment, the engagement projections 8, 8 are inserted into the engagement holes 6, 6 so as to engage the split internal toothed saw disks 4a and 4b, thereby maintaining the annular shape of the two-piece internal toothed saw disk 4. The internal toothed saw disks 4a and 4b can also be engaged using a firmer method of engagement, but the illustrated example using a semi-cone-shaped engagement means is preferable in that it is easy to engage and disengage.

In order to rotate the internal toothed saw disk 4 held by the holder 3 by its periphery while maintaining its annular shape, a rack 9 is mounted onto or formed around the periphery of the surface of the internal toothed saw disk 4 as shown in FIGS. 1 and 4, and driven by a pinion 10 established on mount 2. The annular internal toothed saw disk 4 is rotated, and then the saw and the object are moved parallel to the plane of the saw disk. Then the object A, which is located at the center of the annulus, is cut by the internal teeth B in any desired direction from the circumference. The pinion 10 transmits the rotation of the power unit located at the base of the supporting stick to a speed reducer via the flexible shaft 11. The speed reducer 12 reduces the speed to an appropriate rpm and rotates the internal toothed saw disk. Instead of using this transmission mechanism, the internal toothed saw disk 4 can also be driven by a motor mounted on the mount 2.

In lieu of the above method of rotation using the combination of a rack 9 and pinion 10, a frictional wheel can be pressed onto the surface of the internal toothed saw disk 4 to rotate it. The internal toothed saw disk 4 shown in FIG. 7 rotates as a result of contact with the frictional wheel. The dotted area in the periphery is the friction zone C, which is provided with a surface treatment that ensures significant frictional force and wear resistance. Rotation induced by the frictional wheel can be achieved by replacing the pinion 10 of FIG. 1 with the frictional wheel, which is designed to press onto the surface of the internal toothed saw disk 4 with a certain pressure.

Figure 3:
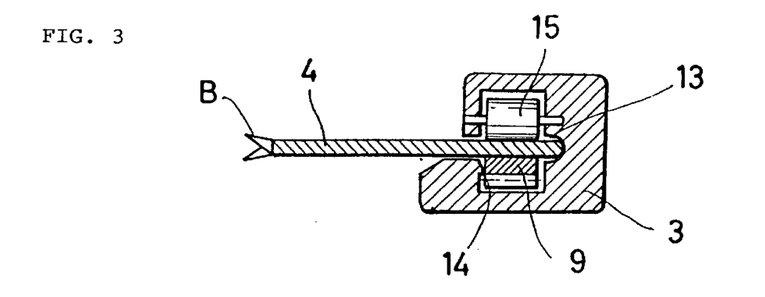
FIG. 3 is an enlarged sectional view of the same saw taken along the line III—III in FIG. 1.

The internal toothed saw disk 4 needs to be rotated smoothly and at a stable position with respect to the holder 3. For this reason, in the sectional construction of the holder shown in FIG. 3, a guide 13 is engraved on the internal circumferential surface of holder 3, and the periphery of internal toothed saw disk 4 is arranged to come into contact with the guide 13. In the internal circumferential surface of the holder 3, front-side walls are formed so as to cross over the rack 9. An internal circumferential guide 14 that is in contact with the internal circumferential surface of the rack 9 is formed on a part of the front-side walls. This prevents the internal toothed saw disk 4 from moving inward with respect to holder 3 as well as preventing the split internal toothed saw disks 4a, 4b from falling off the holder when it is opened. On the back-side wall of the holder 3, a rotary roller 15 in contact with the back surface of the internal toothed saw disk 4 is mounted to prevent the internal toothed saw disk 4 from jolting on the back side of the internal toothed saw disk 4 so that the internal toothed saw disk 4 can rotate smoothly with little resistance. The internal toothed saw disk 4 shown in FIG. 7 is provided with an annular guide wall 16 on the inside of the friction zone C. This guide wall 16 comes into contact with the internal circumferential guide surface 14 of the holder 3 to prevent the split internal toothed saw disks 4a, 4b from falling off the holder when it is opened.

When the holders 3, 3 are closed as shown in FIG. 1, the internal toothed saw disk 4 needs to be rotated freely. Whereas when the holders 3, 3 are open as shown in FIG. 2, the left and right holders 3, 3 hold the split internal toothed saw disks 4a, 4b so that they do not fall off. In order to open the holders 3, 3, the internal toothed saw disk 4 is designed to stop at a prescribed position and be held there so as to prevent idling.

One way of stopping the rotating internal toothed saw disk 4 at a prescribed position is by the use of an electrical control method, in which the rotating position of the internal toothed saw disk 4 is detected by a sensor, so that the motor is immediately stopped when it is detected at the prescribed position. Another way is a physical method, in which brake pads 17 mounted on the surface of the internal toothed saw disk 4 (i.e., the internal circumferential part of the holder) stop the internal toothed saw disk 4, and then the locking claws 18 mounted on the periphery of the holders 3, 3 engage the notches 19 provided on the periphery of the internal toothed saw disk 4 as shown in FIG. 4.

The locking claws 18 may also engage the plane part, rather than the periphery, of the internal toothed saw disk 4. In this case, advanceable and retreatable locking claws are disposed on the side wall of the holder 3 in such a way that they face the internal toothed saw disk 4, and their tips engage holes 20, 20 on the internal toothed saw disk 4 illustrated by the example shown in FIG. 7. These locking claws that engage the holder 3 with the internal toothed saw disk 4 are preferably disengageable by means of manual operation using electric signals or otherwise. This makes it possible to rotate the internal toothed saw disk 4 immediately after the holder is closed. It is also possible to equip the left and right holders with electromagnetic chucks (not shown) that work both as a stopping device and as a positioning device. After a stopping signal is sent, the prescribed position of the internal toothed saw disk 4 is detected, the motor is stopped, and the electromagnetic chucks are activated.

The pair of left and right holders 3, 3 may also be opened or closed by a manual operation using a link mechanism. But it is more convenient to employ a motor that is switched on and off by hand. In this configuration, a screw 21 and a pinion 22 are employed. The screw 21 is provided with a left thread and a right thread. The motor, which can be switched on and off by the operator, rotates the pinion 22, which turns the screw 21 to open or close the holders 3, 3.

Figure 9:
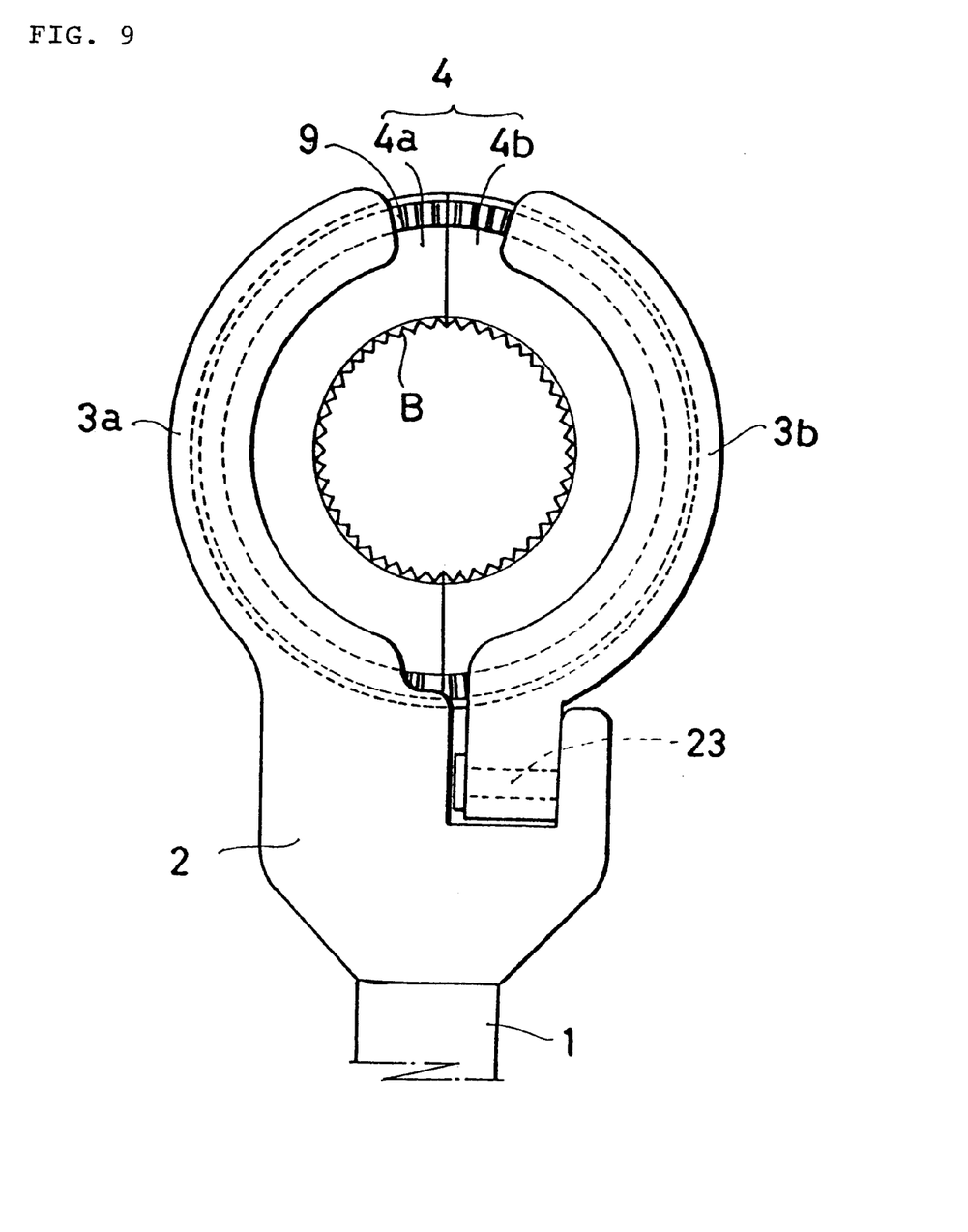
FIG. 9 is a front view of another example of the holder-opening device.
Figure 10:
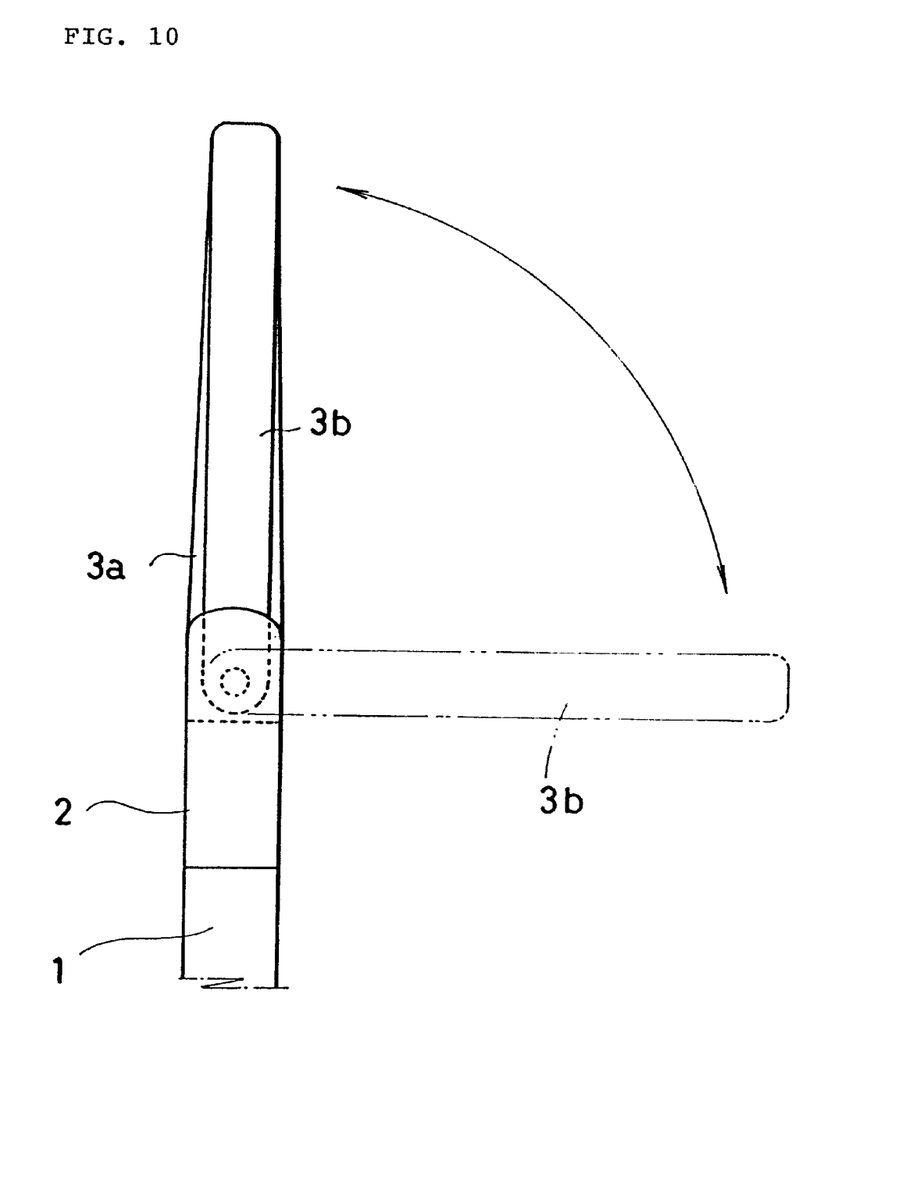
FIG. 10 is a right side view of FIG. 9.

FIG. 9 is a front view showing another embodiment of the holders 3, 3, and FIG. 10 is a side view thereof. In this embodiment, the holder 3a, which is one of the left and right holders, is formed integrally with, or fastened to, the mount 2, and the other holder 3b is supported by the mount 2 via a lateral support shaft 23 which is parallel to the plane of the internal toothed saw disk 4. The holder 3b is designed to flip open pivotally around this support shaft 23. More specifically, the holder 3b is designed to flip open (or to be knocked down), until it is at a right angle to the plane of the internal toothed saw disk 4.

Figure 11:
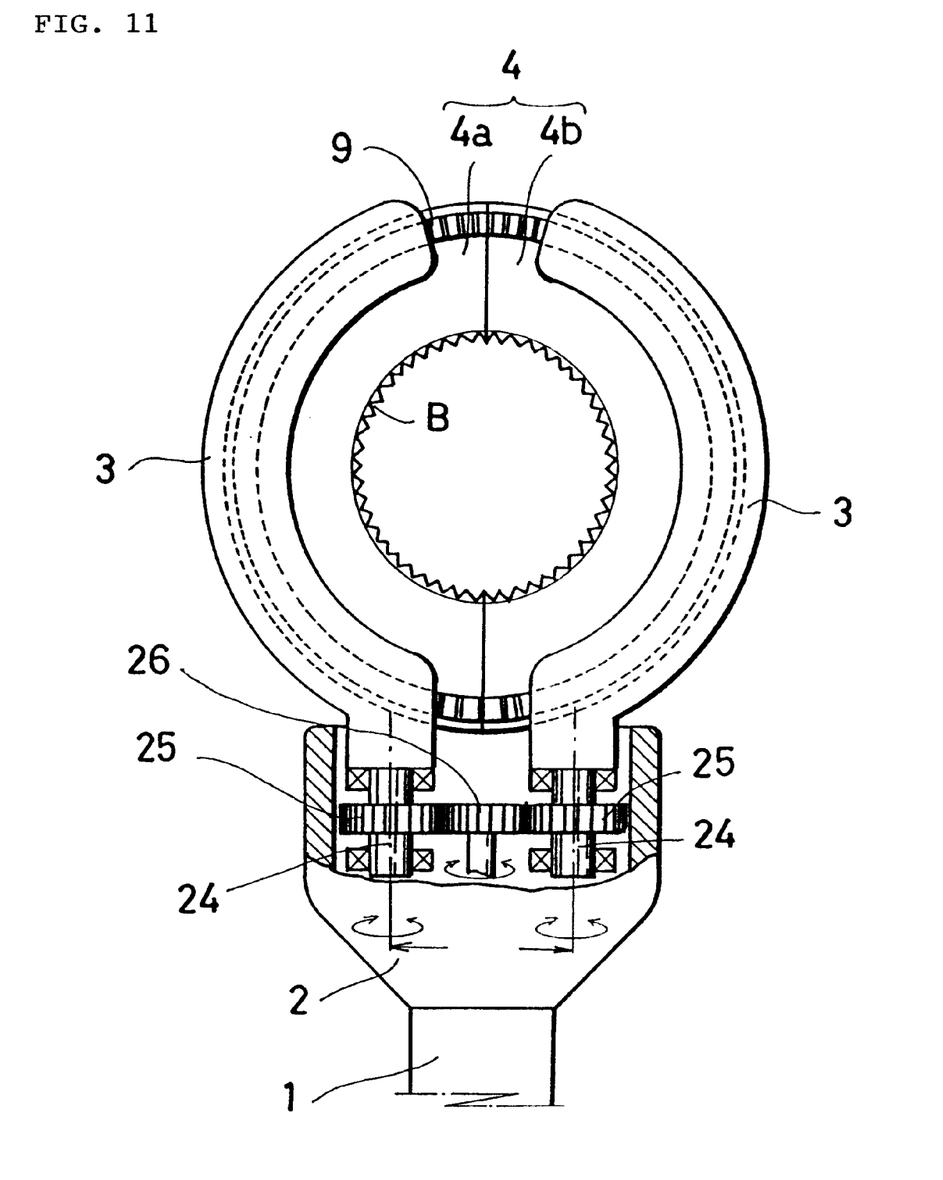
FIG. 11 is a front view of a still another example of the holder-opening device.

In the embodiment illustrated in FIG. 11, the ends of the two semi-circular holders 3, 3 are respectively supported by the mount 2 via the vertical support shafts 24, 24 which are parallel to the plane of the internal toothed saw disk 4, in such a way that they can flip open pivotally around the support shafts 24, 24. In this embodiment, the holders 3, 3 flip open pivotally around the support shafts 24, 24 which are separated by a distance X. Therefore, if both holders are flipped open by 90°, they face each other in parallel. After introducing the object into this space, the two holders 3, 3 are flipped back by 90° to their original positions to cut the object. In this case, the size of the object to be introduced inside the internal toothed saw disk is limited by the distance X between the support shafts 24, 24. In other words, in order to introduce a large object inside the internal toothed saw disk, the distance X should be made sufficiently large.

The two holders 3, 3 may be linked using a gear mechanism so that it is easy to open or close them mechanically. This is convenient for stopping the holders at a precise flipped open position. Specifically, an opening gear 25 mounted on one holder 24 and another opening gear 25 mounted on the other holder 24 are both meshed with a drive gear 26. In the embodiment shown in FIGS. 9 and 1, the construction other than the mechanism for opening and closing the holders is not drawn for the sake of simplification. For the mechanism for stopping the rotation of the internal toothed saw disk 4, any of the mechanisms used in the embodiments illustrated in FIGS. 1 to 8 may be used.

Figure 12:
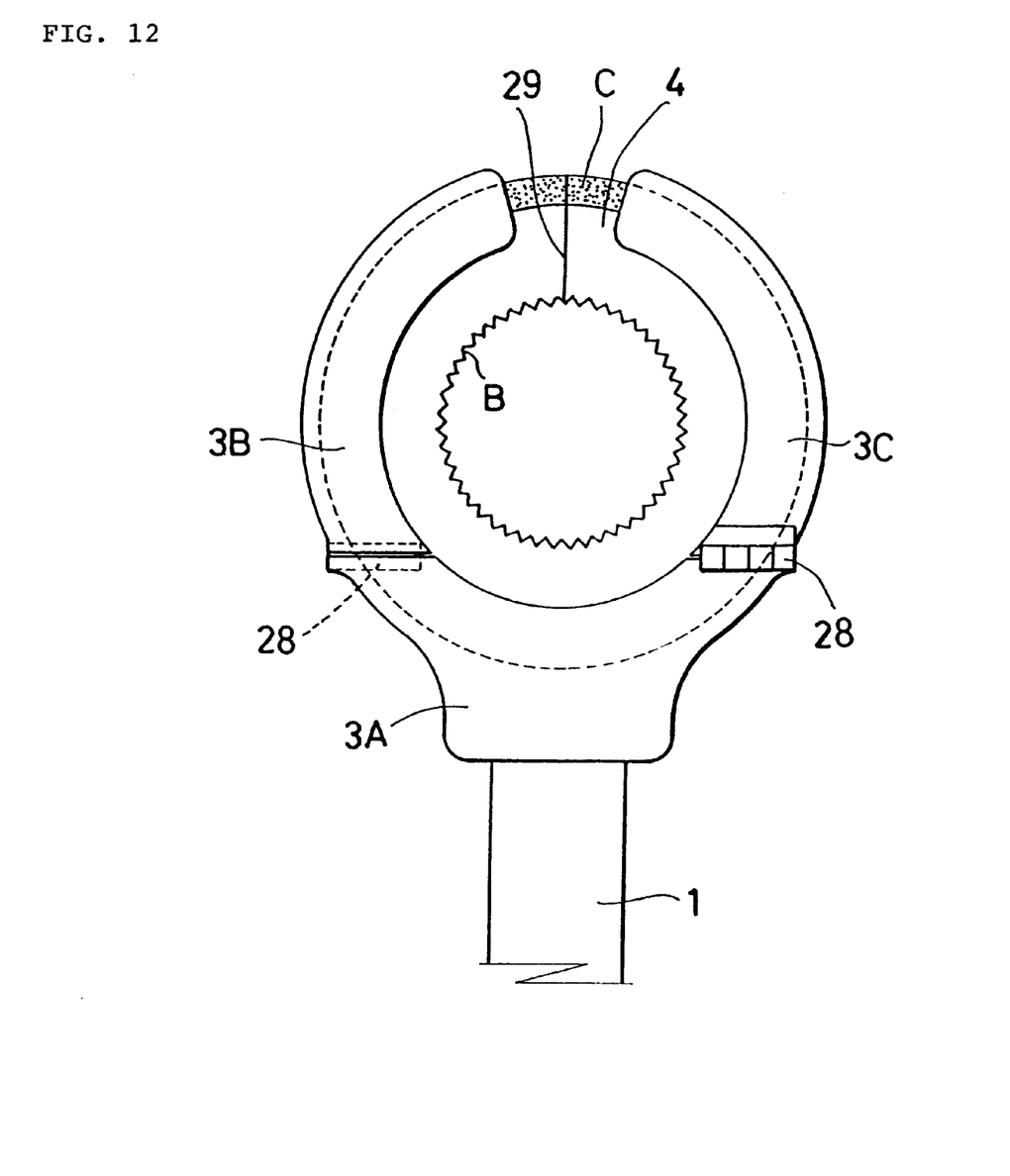
FIG. 12 is a front view showing another embodiment of the present invention.
Figure 13:
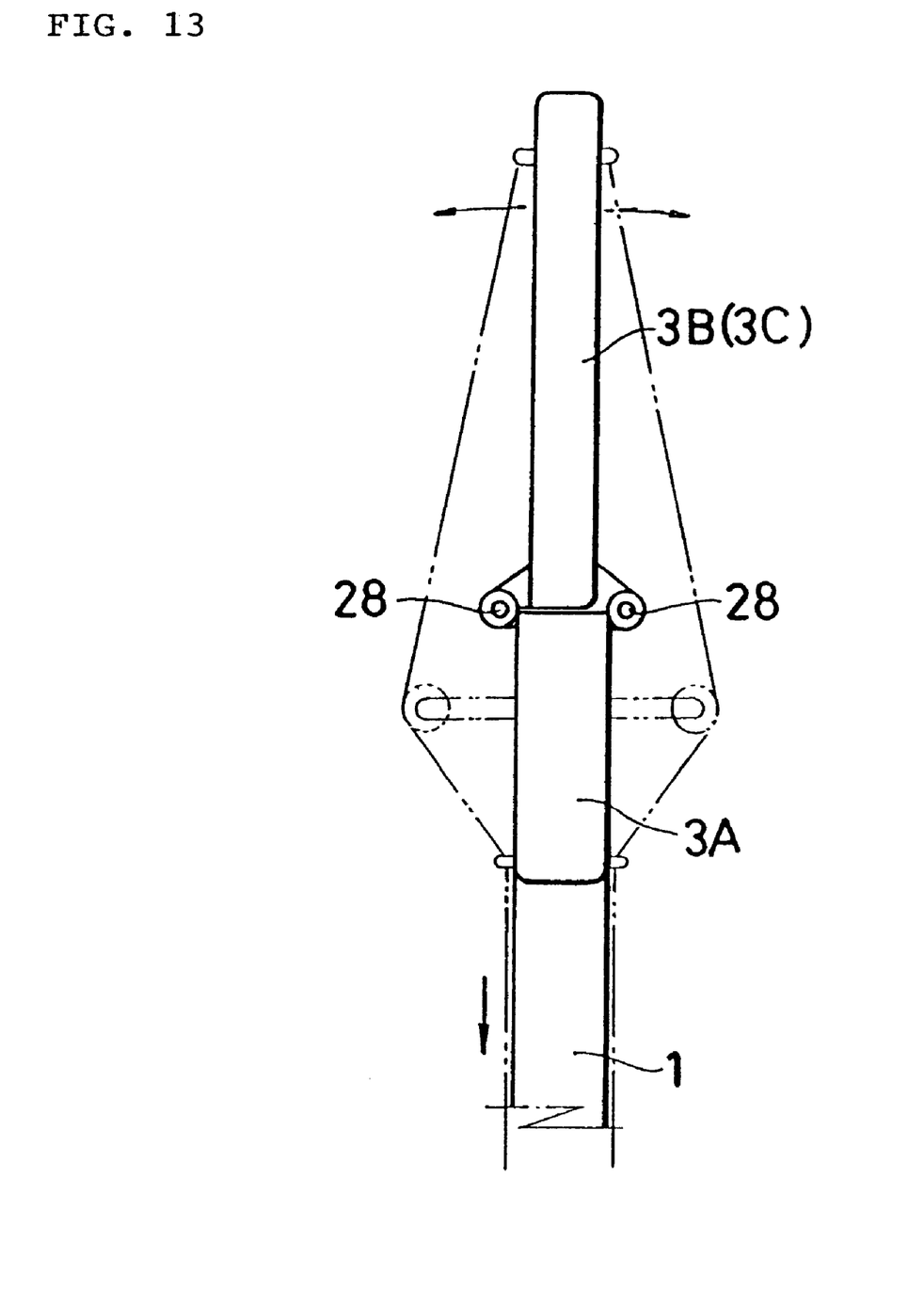
FIG. 13 is a side view of FIG. 12.

FIG. 12 is a front view of another embodiment. In this embodiment, an annular internal toothed saw disk 4 provided with a cut section is supported by three-piece holders, i.e., the bottom holder 3A and the left and right side holders 3B, 3C. The internal toothed saw disk 4 supported by the bottom holder 3A and the side holders 3B, 3C is designed to stop with its cut section positioned at the upper end as shown in the drawing. The side holders 3B, 3C are supported by the support shafts 28, 28. As shown in FIG. 13, the side holders 3B, 3C are designed to pivotally rotate around their bottom ends in opposite directions with respect to the plane of the internal toothed saw disk 4.

By so designing, when the side holders 3B and 3C are rotated in different directions in the condition shown in FIG. 12, a torsional force is applied to the internal toothed saw disk 4 which is provided with a cut section 29. This torsional force pushes the left and right parts of the internal toothed saw disk 4 in opposite directions and opens the cut section 29. The object can be introduced inside the internal toothed saw disk 4 through this opening, and can be cut after the internal toothed saw disk 4 returns to a complete annulus. In FIG. 12, the means for driving the internal toothed saw disk 4 is not drawn, but it can be realized using the gears and frictional wheel described earlier. The cut section 29 of the internal toothed saw disk 4 is provided with an engaging means having a cut shape as shown in FIG. 6 so that a perfect annulus is maintained when the separated parts of the internal toothed saw disk 4 return to their original positions. The left and right side holders 3B, 3C are provided with a traction means as indicated by alternate long and two short dashes lines or a pressure means using a link mechanism (not shown) so that forces are applied to the left and right side holders 3B, 3C in different directions.

It is also possible to design the side holders 3B, 3C as simple covers that are pivotable with respect to the bottom holder. In this case, the internal toothed saw disk 4 maintains its annulus by its own resilience. In such a design, the object is pressed against the cut part of the internal toothed saw disk 4 or parts of the side holders 3B, 3C to force-open the cut section 29 of the internal toothed saw disk 4.

Figure 14:
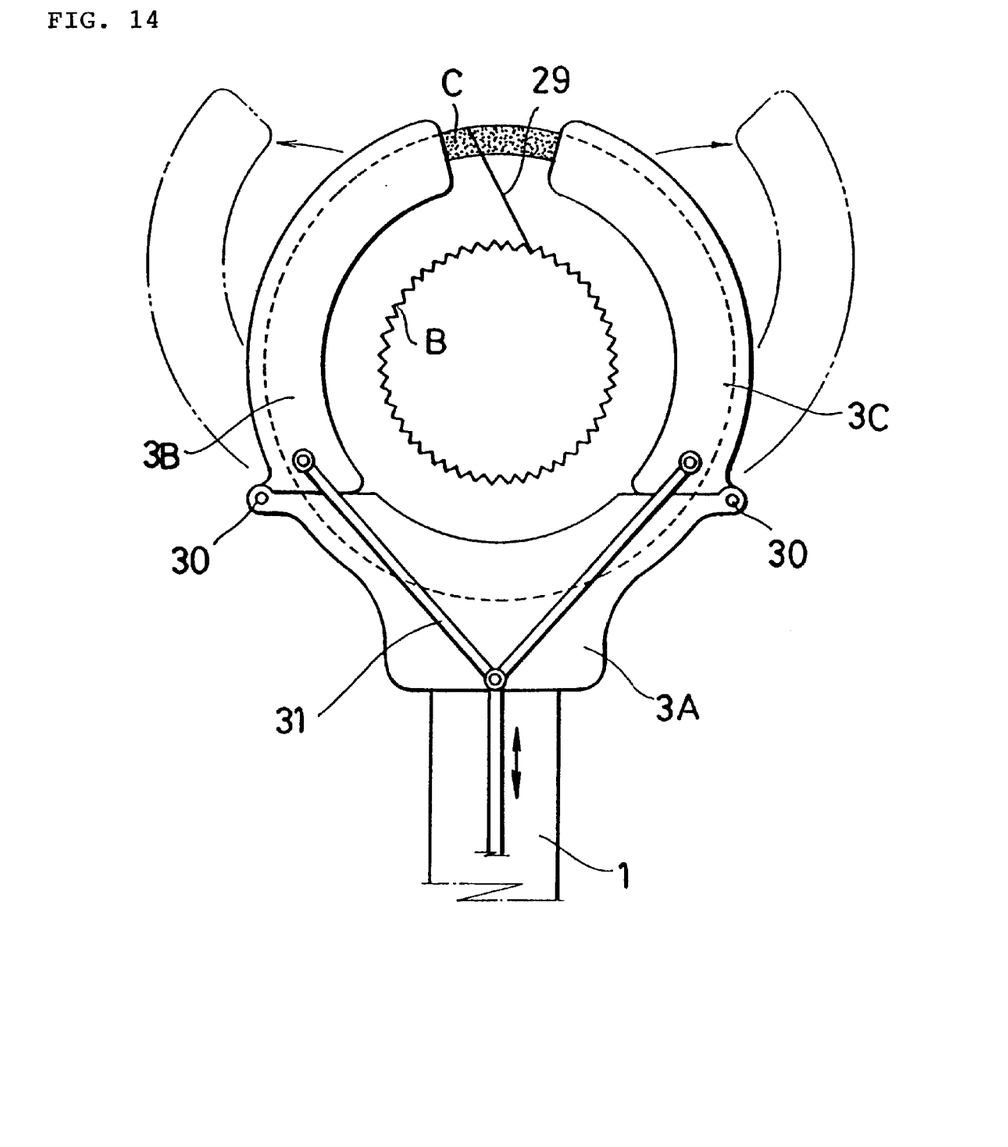
FIG. 14 is a front view showing yet another embodiment of the present invention.

The embodiment shown in FIG. 14 is similar to the one shown in FIG. 12; an annular internal toothed saw disk 4, which is provided with a cut, is supported by three-piece holders, i.e., the bottom holder 3A and the left and right side holders 3B, 3C. In the embodiment shown in FIG. 14, the bottom holder 3A and the side holders 3B, 3C are axially supported by the support shafts 30, 30, which are located along the peripheral parts. The side holders 3B, 3C open outwards as shown by alternate long and two short dash lines to expose the internal toothed saw disk 4. In this condition, if forces act on the left and right sides of the cut section 29 of the internal toothed saw disk 4 in different directions with respect to the disk plane, the internal toothed saw disk 4 is twisted and the cut section 29 is opened. The object can then be introduced inside the internal toothed saw disk 4 through this opening. In order to open the cut section 29, the object (e.g., a tree branch) can be pushed against one side of the cut section 29. Then the cut section 29 is forced open in resistance to the resilience of the internal toothed saw disk 4. In order to open the cut section 29, another means of pressure may also be provided to push the surface of the internal toothed saw disk 4 in the planar direction.

Means for driving the internal toothed saw disk 4 and means for locking the same at a prescribed position are not included in FIG. 14, but those depicted in FIG. 1 can be added to this embodiment too. Numeral 31 in FIG. 14 is an example of a link mechanism for opening and closing the left and right side holders 3B, 3C. To open the side holders 3B, 3C, the rotation of the internal toothed saw disk 4 is stopped when the cut section comes to a prescribed position (top end in the drawing), and this position is maintained by the bottom holder 3A. This is the same as in the case of the embodiment shown in FIG. 12.

In the embodiment shown in FIG. 1, the mount 2 is fastened to the tip of the supporting stick 1, and a pair of holders 3, 3 are attached to this mount 2. This invention can be embodied in the form of a hand-held saw in which the mount 2 is a handle, or a work saw in which the mount 2 is fastened to a work bench. To use the rotary internal toothed saw of the present invention for cutting a branch at a high position, for example, the holders are opened as shown in FIG. 2 to position the branch inside the internal teeth B, and the saw assembly is moved to the desired position to cut the branch by driving the internal toothed saw disk. When the cutting position is close to the tip of the object, the saw or the object can be moved so that the object is inside the internal toothed saw disk 4. In this case, there is no need to open the holders.

According to the rotary internal toothed saw of the present invention, it is possible to put into use a versatile saw that can be used in woodwork, pruning of a plant or tree and trimming, and in particular, a rotary internal toothed saw for pruning high branches. The rotary internal toothed saw of the present invention is capable of accurately cutting the object inside the internal teeth from any peripheral direction. It can be effectively used in the trimming of high branches because it can cut a branch at a high position either from the upper side or from the lower side. This way of cutting is not possible with conventional types of high-branch pruning saws. The rotary internal toothed saw of the present invention can also cut a branch from any appropriate direction accurately, leaving no joint on the trunk.

According to the invention, by employing one internal toothed saw disk provided with a cut section, it is possible to put into use a versatile saw that can be used in woodworking, pruning of plants or trees and trimming, and in particular, a rotary internal toothed saw for pruning high branches, without dividing the internal toothed saw disk into two.

What is claimed is:

1. A rotary internal toothed saw comprising an openable pair of left and right holders rotatably supporting a periphery of an annular two-piece internal toothed saw disk and a means for rotating said annular two-piece internal toothed saw disk, wherein the annular two-piece internal toothed saw disk is rotated with its annular shape maintained when the holders are closed, and stopped at a fixed position with respect to the pair of holders when the left and right holders are open while each of said pair of left and right holders support their respective pieces of the two-piece internal toothed saw disk.

2. The rotary internal toothed saw of claim 1 wherein the lower parts of the pair of left and right holders are pivotally supported on a mount via support shafts running at a right angle to the plane of the annular two-piece internal toothed saw disk, and the left and right holders pivotally open to the left and right around the support shafts at their lower parts in the direction parallel to the plane of the annular two-piece internal toothed saw disk.

3. The rotary internal toothed saw of claim 1 wherein the lower part of one of the left and right holders is pivotally supported on a mount via a lateral support shaft running parallel to the plane of the annular two-piece internal toothed saw disk, and the holder pivots around the lateral support shaft in a direction perpendicular to the plane of the annular two-piece internal toothed saw disk.

4. The rotary in toothed saw of claim 1 wherein the lower parts of the left and right holders are pivotally supported on a mount via vertical support shafts running parallel to the plane of the annular two-piece internal toothed saw disk, and the left and right holders pivot around the support shafts.

5. A rotary internal toothed saw in which a periphery of an annular internal toothed saw disk, which is cut at one place, is rotatably supported by a holder which is divided at at least one point along its periphery, wherein the annular internal toothed saw disk is rotated with its annulus maintained in a planar condition by said holder and stopped at the position where the divided position of the holder and the cut position of the internal toothed saw disk meet when said holder is opened, and both parts of the holder pivot in relatively different directions that are each perpendicular to the plane of the annular internal toothed saw disk so as to allow the cut part of the annular internal toothed saw disk to open.

6. A rotary internal toothed saw in which the periphery of an annular internal toothed saw disk, which is cut at one place, is rotatably supported by a holder which is divided into plural parts, wherein the annular internal toothed saw disk is held by at least some of the plural parts of the divided holder, some of the parts of the divided holder are openable so that the internal toothed saw disk is exposed, and at the cut position of the exposed annular internal saw disk the cut part can be opened by forces acting in directions perpendicular to the plane of the internal toothed saw disk.

* * * * *